United States Patent
Kornstädt et al.

(10) Patent No.: US 9,092,052 B2
(45) Date of Patent: Jul. 28, 2015

(54) METHOD AND APPARATUS FOR OBTAINING ENTITY-RELATED DECISION SUPPORT INFORMATION BASED ON USER-SUPPLIED PREFERENCES

(71) Applicants: Andreas Kornstädt, Quickborn (DE); Ingo Mertins, Rügge (DE)

(72) Inventors: Andreas Kornstädt, Quickborn (DE); Ingo Mertins, Rügge (DE)

( * ) Notice: Subject to any disclaimer, the term of this patent is extended or adjusted under 35 U.S.C. 154(b) by 309 days.

(21) Appl. No.: 13/859,575

(22) Filed: Apr. 9, 2013

(65) Prior Publication Data

US 2014/0026044 A1    Jan. 23, 2014

Related U.S. Application Data

(60) Provisional application No. 61/622,245, filed on Apr. 10, 2012.

(51) Int. Cl.
  *G06F 15/16* (2006.01)
  *G06F 3/01* (2006.01)
  *G06F 3/16* (2006.01)

(52) U.S. Cl.
  CPC ...... *G06F 3/01* (2013.01); *G06F 3/016* (2013.01); *G06F 3/167* (2013.01)

(58) Field of Classification Search
  None
  See application file for complete search history.

(56) References Cited

U.S. PATENT DOCUMENTS

| | | | |
|---|---|---|---|
| 7,894,448 B1 * | 2/2011 | Lillibridge et al. | 370/395.21 |
| 8,166,026 B1 * | 4/2012 | Sadler | 707/725 |
| 8,370,368 B2 * | 2/2013 | O'Sullivan et al. | 707/754 |
| 8,635,216 B1 * | 1/2014 | Hepworth et al. | 707/733 |
| 2002/0024532 A1 * | 2/2002 | Fables et al. | 345/700 |
| 2004/0230564 A1 * | 11/2004 | Simon et al. | 707/2 |
| 2005/0071328 A1 * | 3/2005 | Lawrence | 707/3 |
| 2005/0203884 A1 * | 9/2005 | Allen et al. | 707/3 |
| 2007/0016570 A1 * | 1/2007 | Punaganti Venkata et al. | 707/4 |
| 2007/0078835 A1 * | 4/2007 | Donnelli | 707/3 |
| 2007/0219963 A1 * | 9/2007 | Soroca | 707/3 |
| 2007/0288473 A1 * | 12/2007 | Mukherjee et al. | 707/10 |
| 2008/0005069 A1 * | 1/2008 | Payne et al. | 707/3 |
| 2009/0077033 A1 * | 3/2009 | McGary et al. | 707/3 |
| 2011/0153425 A1 * | 6/2011 | Mercs | 705/14.54 |
| 2011/0320466 A1 * | 12/2011 | Broshi et al. | 707/754 |
| 2012/0036263 A1 * | 2/2012 | Madden et al. | 709/225 |
| 2012/0078882 A1 * | 3/2012 | Boldyrev et al. | 707/722 |
| 2012/0311441 A1 * | 12/2012 | Reyna et al. | 715/716 |
| 2013/0013408 A1 * | 1/2013 | Hjelm et al. | 705/14.54 |

\* cited by examiner

*Primary Examiner* — Kenny Lin

(57) ABSTRACT

In a portable computing device having at least one kind of input, at least one kind of output, and a data communications interface, a method and apparatus for obtaining entity-related "acceptable or unacceptable" decisions based on matching the results of internet information retrieval against user-supplied, persistent preferences are described. User-supplied preferences consist of a list of internet information resources the user wants to be examined to obtain a decision about whether or not an entity is acceptable, and of a list of criteria that an entity from said internet information resources has to meet to be found acceptable by the user. In one embodiment, a graphical user interface on the portable computing device is provided, allowing the identification of an entity. Identification of an entity automatically initiates information retrieval about the identified entity from the internet information resources of the user's preferences, automatically yielding, upon completion, a clearly discernible output in the form of a ternary "acceptable"/"unacceptable"/"undecidable" indicator on the portable computing device. The "acceptable" indicator is output if at least one criterion from the user's preferences has been met and no criterion from the user's preferences has been violated; the "unacceptable" indicator is output if at least one criterion from the user's preferences has been violated; the "undecidable" indicator is output otherwise.

24 Claims, 6 Drawing Sheets

METHOD AND APPARATUS FOR OBTAINING ENTITY-RELATED DECISION SUPPORT INFORMATION BASED ON USER-SUPPLIED PREFERENCES

CROSS REFERENCES TO RELATED APPLICATIONS

This application claims the benefits of provisional patent application Ser. No. 61/622,245, filed 2012 Apr. 10 by the present inventors.

BACKGROUND OF THE INVENTION

1. Field of Invention

This invention relates generally to portable computing devices having a data communications interface. More specifically, the invention describes a method and apparatus for use in a portable computing device having at least one kind of input, at least one kind of output, and a data communications interface.

2. Description of Related Art

Recent developments in consumer electronics have included the introduction of portable computing devices having a data communications interface. Exemplary devices of this kind are smart phones, tablet computers, and portable multimedia asset players with internet capabilities. When a user desires to obtain information about whether a certain entity meets certain user-specified quality criteria, one of these devices can be used to locate and accumulate information about that specific entity. If a certain amount of information that is deemed to be sufficient by the user has thus been accumulated by the user, the user can decide whether the specified entity meets the user-specified quality criteria or not. Entities can include but are not limited to identifiable objects, such as products, services, places, persons, organizations, events, concepts, etc.

What is required is a method and apparatus that provides for user-friendly and efficient obtention of entity-related decision support information based on persistent, user-supplied preferences in a portable computing device having a data communication interface.

SUMMARY OF THE INVENTION

The invention described herein pertains to a method and apparatus that provides for user-friendly and efficient obtention of entity-related decision support information based on persistent, user-supplied preferences in a portable computing device having a data communication interface; the user-supplied preferences (sometimes referred to as an acceptance profile) consisting of (a) a list of internet information resources the user wants to have examined to obtain information about an entity (an internet information resource being any kind of resource accessible using a protocol from the internet protocol suite, e.g. websites, ftp servers, remote access databases, etc.), and (b) a list of criteria, each pertaining to at least one of said internet information resources and specifying a certain quality an entity has to meet to be found acceptable. User-supplied preferences pertaining to this invention are persistent and are thus available for supporting a multitude of decisions without the need of restating the user-supplied preferences each time the user desires to obtain decision support. In one embodiment, a method of providing entity-related decision support information in a computing device by way of receiving user input identifying an entity and outputting a ternary "acceptable", "unacceptable", "undecidable" indicator based on a user-supplied acceptance profile is described. User input identifying an entity is waited for and received. Based upon the user-identified entity, trying to obtain information about the identified entity from each internet information resource of the user's acceptance profile using the device's data communication interface. Based upon the information obtained from the internet information resources of the user's acceptance profile, automatically establishing for every criterion of the user's acceptance profile whether criterion has been met or violated. Automatically outputting a clearly discernible ternary "acceptable", "unacceptable", "undecidable" indicator indicating the overall acceptability of the indentified entity based on the user's acceptance profile: (a) outputting an "acceptable" indicator if at least one criterion has been met and no criterion has been violated, (b) outputting an "unacceptable" indicator if at least one criterion has been violated, (c) outputting an "undecidable" indicator otherwise.

In one embodiment, a method of providing entity-related decision support information in a computing device by way of receiving user input identifying an entity and outputting a ternary "acceptable", "unacceptable", "undecidable" indicator based on a user-supplied acceptance profile residing in the computing device is described. User input identifying an entity is waited for and received. Based upon the user-identified entity, trying to obtain information about the identified entity from each internet information resource of the user's acceptance profile using the device's data communication interface. Based upon the information obtained from the internet information resources of the user's acceptance profile, automatically establishing for every criterion of the user's acceptance profile whether criterion has been met or violated. Automatically outputting a clearly discernible ternary "acceptable", "unacceptable", "undecidable" indicator indicating the overall acceptability of the indentified entity based on the user's acceptance profile: (a) outputting an "acceptable" indicator if at least one criterion has been met and no criterion has been violated, (b) outputting an "unacceptable" indicator if at least one criterion has been violated, (c) outputting an "undecidable" indicator otherwise.

In another embodiment, a method of providing entity-related decision support information in a computing device by way of receiving user input identifying an entity and outputting a ternary "acceptable", "unacceptable", "undecidable" indicator based on a user-supplied acceptance profile residing in the computing device is described. User input identifying an entity is waited for and received. Based upon the user-identified entity, trying to obtain information about the identified entity from each internet information resource of the user's acceptance profile using the device's data communication interface. Based upon the information obtained from the internet information resources of the user's acceptance profile, automatically establishing within the confines of the portable computing device for every criterion of the user's acceptance profile whether criterion has been met or violated. Automatically outputting a clearly discernible ternary "acceptable", "unacceptable", "undecidable" indicator indicating the overall acceptability of the indentified entity based on the user's acceptance profile: (a) outputting an "acceptable" indicator if at least one criterion has been met and no criterion has been violated, (b) outputting an "unacceptable" indicator if at least one criterion has been violated, (c) outputting an "undecidable" indicator otherwise.

In one embodiment, a method of providing entity-related decision support information in a computing device by way of receiving user input from a graphical user interface identifying an entity and displaying a graphical ternary "acceptable", "unacceptable", "undecidable" indicator based on a user-supplied acceptance profile residing in the computing device is described. User input identifying an entity is waited for and received. Based upon the user-identified entity, trying to obtain information about the identified entity from each internet information resource of the user's acceptance profile using the device's data communication interface. Based upon the information obtained from the internet information resources of the user's acceptance profile, automatically establishing within the confines of the portable computing device for every criterion of the user's acceptance profile whether that criterion has been met or violated. Automatically displaying a clearly discernible ternary "acceptable", "unacceptable", "undecidable" indicator indicating the overall acceptability of the indentified entity based on the user's acceptance profile: (a) outputting an "acceptable" indicator if at least one criterion has been met and no criterion has been violated, (b) outputting an "unacceptable" indicator if at least one criterion has been violated, (c) outputting an "undecidable" indicator otherwise. Automatically displaying a list with each list entry corresponding to one criterion from the user's acceptance profile and indicating: (a) the criterion has been met, (b) the criterion has been violated, or (c) no information to make a statement concerning the criterion could be obtained.

BRIEF DESCRIPTION OF THE DRAWINGS

The invention will be better understood by reference to the following description taken in conjunction with the accompanying drawings.

DETAILED DESCRIPTION OF SELECTED EMBODIMENTS

Reference will now be made in detail to a selected embodiment of the invention. An example of a selected embodiment is illustrated in the accompanying drawings. While the invention will be described in conjunction with a selected embodiment, it will be understood that it is not intended to limit the invention to one embodiment. To the contrary, it is intended to cover alternatives, modifications, and equivalents as may be included within the spirit and scope of the invention as defined by the appended claims.

With the rapid increase of internet information resources providing information about entities, services, articles, and products, making an optimal decision about a particular entity, is a daunting task indeed. With the advent of portable computing devices providing ubiquitous internet access, information for making decisions can be gathered anywhere where internet access is available. The combination of (a) a growing number of internet information resources that users desire to peruse in the course of building an evidence base for making a decision about the acceptability of an entity and (b) the limited screen estate portable computing devices offer make for an agony of choices and an agony of choosing. This agony is augmented by the fact that information drawn from different internet information resources is usually maintained in separate web browsing sessions or applications, forcing users to switch back and forth to get an overview unless they are able to memorize all pieces of information gathered up to a given point. Said agony is further augmented by the fact that—although users' preferences concerning a certain kind of entity are quite stable over time—information gathering has to start anew by specifying the user's preferences again for every internet information resource consulted when searching for another entity. Therefore the invention described herein is well-suited for providing a user-friendly and efficient method for obtaining entity-related decision support information based on persistent, user-supplied preferences in a portable computing device having a data communication interface. In the described embodiment, the portable computing device having a data communication interface takes the form of a smartphone. Accordingly, a method and apparatus for obtaining entity-related decision support information based on persistent, user-supplied preferences in a smartphone is described.

Figure 1:
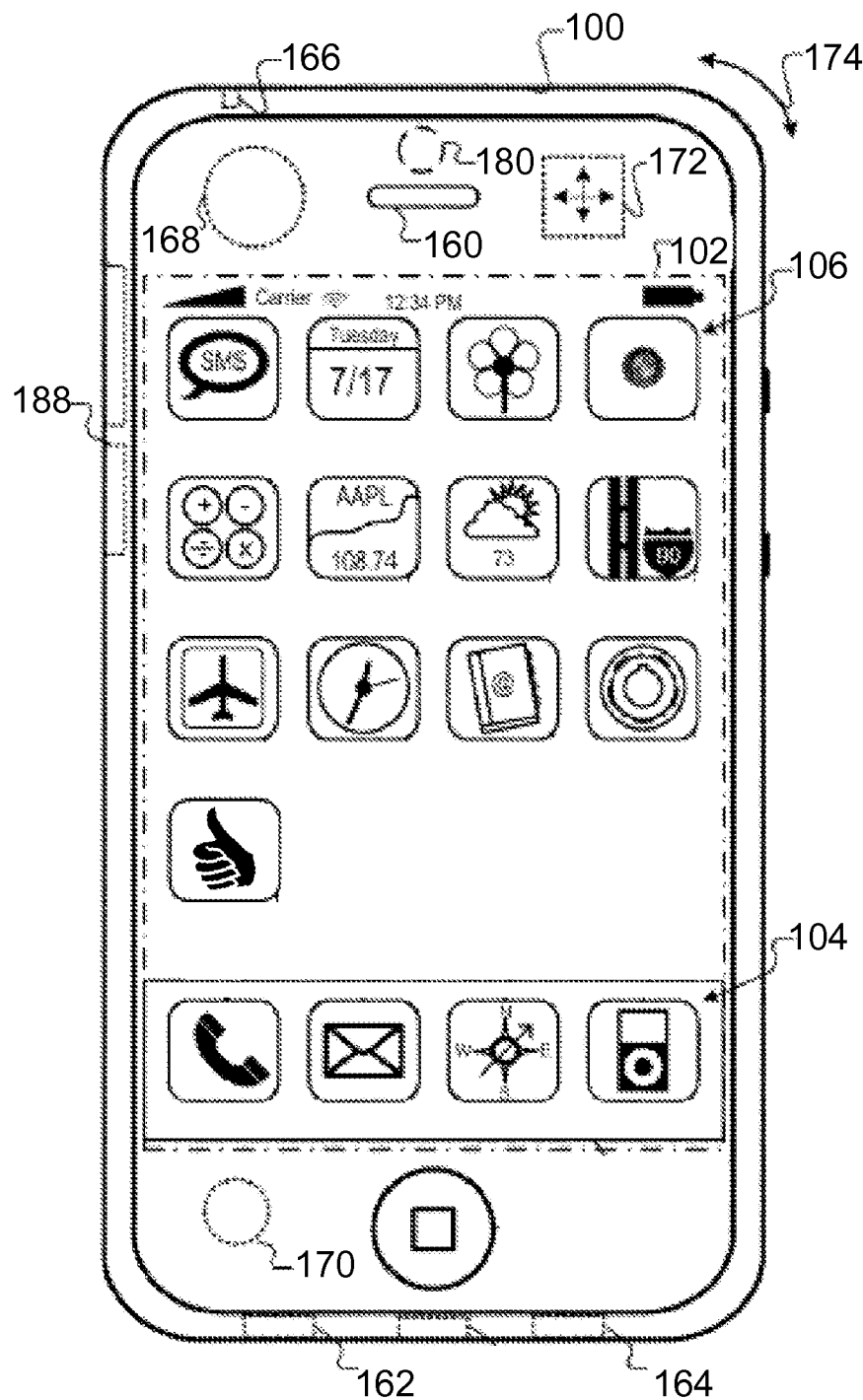
FIG. 1 illustrates features of a portable computing device 100 that may serve as a platform for execution of software implementations in accordance with some embodiments of the invention.

Accordingly, FIG. 1 illustrates features of a smartphone that may serve as a platform for execution of software implementations in accordance with some embodiments of the invention. More specifically, FIG. 1 is a block diagram of a smartphone 100 that is generally consistent with commercially-available versions of an IPHONE™ smartphone, manufactured by Apple Inc. of Cupertino. Although embodiments of the invention are certainly not limited to IPHONE deployments or applications (or even to IPHONE-type devices), the IPHONE smartphone, together with its rich complement of sensors, multimedia facilities, application programmer interfaces and wireless application delivery model, provides a highly capable platform on which to deploy certain implementations.

Summarizing briefly, smartphone 100 includes memory (not shown), a memory controller (not shown), a file system (not shown), and a display 102 that can be sensitive to haptic and/or tactile contact with a user. Touch-sensitive display 102 can support multi-touch features, processing multiple simultaneous touch points, including processing data related to the pressure, degree and/or position of each touch point. Such processing facilitates gestures and interactions with multiple fingers, chording, and other interactions such as, but not limited to text input. Of course, other touch-sensitive display technologies can also be used, e.g., a display in which contact is made using a stylus or other pointing device.

Typically, smartphone 100 presents a graphical user interface on the touch-sensitive display 102, providing the user access to various system objects and for conveying. In some implementations, the graphical user interface can include one or more display objects 104, 106. In the example shown, the display objects 104, 106, are graphic representations of system objects. Examples of system objects include device functions, applications, windows, files, alerts, events, or other identifiable system objects. In some embodiments of the present invention, applications, when executed, provide at least some of the functionality described herein.

Typically, the smartphone 100 supports network connectivity including, for example, both mobile radio and wireless internetworking functionality to enable the user to travel with the smartphone 100 and its associated network-enabled functions. In some cases, the smartphone 100 can interact with other devices in the vicinity (e.g., via Wi-Fi, Bluetooth, etc.).

For example, smartphone 100 can be configured to interact with peers or a base station for one or more devices. As such, smartphone 100 may grant or deny network access to other wireless devices.

Smartphone 100 includes a variety of input/output (I/O) devices, sensors and transducers. For example, a speaker 160 and a microphone 162 are typically included to facilitate audio, such as the capture of vocal input and audible rendering of output as described elsewhere herein. An external speaker port 164 can be included to facilitate hands-free voice functionalities, such as speaker phone functions. An audio jack 166 can also be included for use of headphones and/or a microphone.

Other sensors can also be used or provided. A proximity sensor 168 can be included to facilitate the detection of user positioning of smartphone 100. In some implementations, an ambient light sensor 170 can be utilized to facilitate adjusting brightness of the touch-sensitive display 102. An accelerometer 172 can be utilized to detect movement of smartphone 100, as indicated by the directional arrow 174. Accordingly, display objects and/or media can be presented according to a detected orientation, e.g., portrait or landscape. In some implementations, smartphone 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate. Smartphone 100 can also include a camera lens and sensor 180. In some implementations, the camera lens and sensor 180 can be located on the back surface of the smartphone 100. The camera can capture still images and/or video for identifying entities as described elsewhere herein. Smartphone 100 can also include vibrator (not shown) to generate vibrational patterns of output as described elsewhere herein.

Smartphone 100 can also include one or more wireless communication subsystems, such as an 802.11b/g communication device, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), near field communications (NFC), etc. Communication protocols can be used for acquiring input from external devices for identifying entities as described elsewhere herein. Communication protocols can also be used to transmit entity-based decision support information to external devices as described elsewhere herein.

Figure 2:
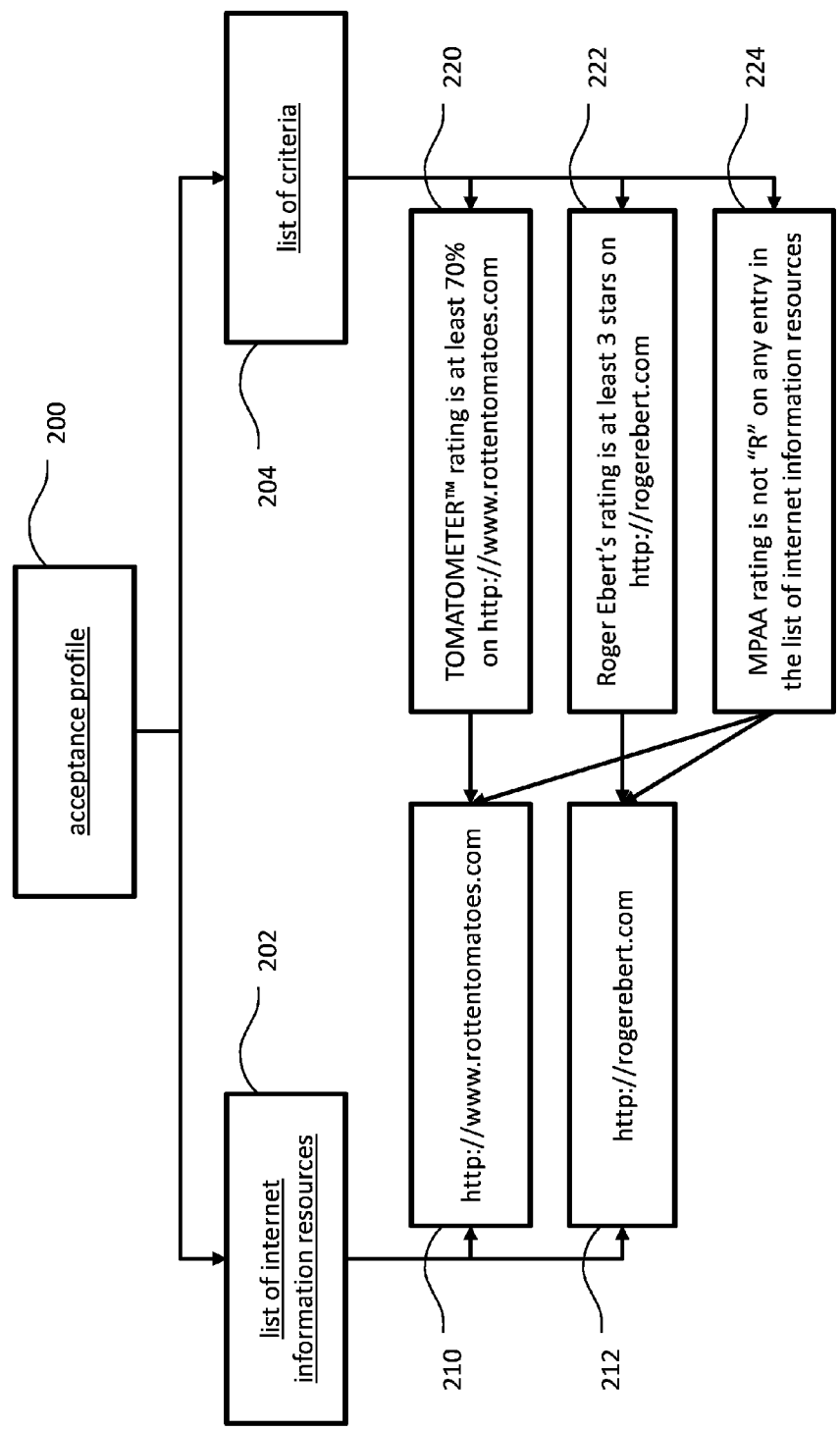
FIG. 2 illustrates an exemplary user-specified acceptance profile in accordance with some embodiment of the invention.

For example, in a particular embodiment, the user-specified preferences are configured as illustrated in FIG. 2 and are resident in the file system of smartphone 100. In this particular case the acceptance profile 200 consists of a list of internet information resources 202 and a list of criteria 204. The list of internet information resources 202 contains two entries 210 (movie rating website http://www.rottentomatoes.com of Rotten Tomatoes™ (trademark of Flixster, Inc. of San Francisco)) and 212 (movie rating website http://rogerebert.com of Roger Ebert). The list of criteria 204 contains three entries 220 ("TOMATOMETER™ (trademark of Flixster, Inc. of San Francisco) rating is at least 70% on http://www.rottentomatoes.com"), 222 ("Roger Ebert's rating is at least 3 stars on http://rogerebert.com"), and 224 ("MPAA rating is not "R"™ (trademark of the Motion Picture Association of America, Inc. of Sherman Oaks) on any entry in the list of internet information resources"). It should be noted that each criterion from the list of criteria pertains to at least one internet information resource and can pertain to as many as all internet information resources in the list of internet information resources 202. In the described embodiment, the display 102 of smartphone 100 provides one of several input methods to identify entities for which the user desires to obtain decision support information in accordance with his acceptance profile 200. Therefore, a graphical user interface for text entry of a movie title is provided. For example, if the movie title "The Girl with the Dragon Tattoo" is entered, all internet information resources from the list of internet information resources 202 of the user's acceptance profile 200 are automatically accessed by means of one of smartphone's 100 communication devices 188. In this example it is assumed that all internet information resources 110 and 112 from list 102 are reachable and yield information about the criteria required by criterion 220, 222, and 224 to decide whether the movie "The Girl with the Dragon Tattoo" is acceptable or not according to the user's acceptance profile 200. Rotten Tomatoes 210 yields a TOMATOMETER™ rating of 87%, Roger Ebert 212 yields a rating of 3.5 stars and both Rotten Tomatoes 210 and Roger Ebert 212 yield a MPAA rating of "R"™. Based on these pieces of information, each criterion 220, 222, and 224 from criteria list 204 is automatically examined. Criterion 220 is met as the movie's Tomatometer™ rating of 87% from internet information resource 210 is above the required 70%. Criterion 222 is met as Roger Ebert's rating of 3.5 stars from internet information resource 212 for the movie is above the required 3 stars. Criterion 224 is violated as both internet information resources 210 and 212 yield a rating of "R"™. Based on this evaluation, a clearly discernible graphical indicator indicating that the movie "The Girl with the Dragon Tattoo" is unacceptable according to the user's acceptance profile 200 is shown on display 102. In some implementations of the described embodiment, this indicator could take the form of a yellow warning sign, a red stop sign mark, a downward pointing thumb on red background, or any other graphical symbol with a generally accepted negative connotation. In some embodiments, an additional list, each entry indicating how each criterion from the list of criteria 202 has been met or violated is displayed. In those embodiments, said list is displayed in such a way that the list is clearly subordinate in relevance to the clearly discernible graphical indicator indicating the overall acceptability of the movie "The Girl with the Dragon Tattoo". If those embodiments where said additional list is provided, each list entry is displayed in such a way that it is clearly visible whether an individual criterion has been met (such as criteria 220 and 222) or whether an individual criterion has been violated (such as criterion 224). In some implementations, this is indicated e.g. by a background color bearing a positive connotation for criteria that have been met (for example green) or by a background color bearing a negative connotation for criteria that have been violated (for example red). In some embodiments, items from said list are user-selectable, automatically displaying, when user-selected, entity-related information from internet information resources pertaining to the user-selected list entry. In some embodiments, information about the decision support information shown on display 102 can be shared by e-mail, text message, other messaging systems, or social networks. In some other embodiments, the decision support information shown on display 102 is automatically in the smartphone's 100 file system so that the user can be provided with a history of entities for which he obtained decision support information. Contrary to the set up described so far for the selected embodiment, had the list of criteria 204 not contained criterion 224, then all criteria 220 and 222 had been met. Accordingly, a clearly discernible graphical indicator indicating that the movie "The Girl with the Dragon Tattoo" is acceptable had been shown on display 102. In some implementations of the described embodiment, this indicator could take the form of an abstracted smiling face, a green checkmark, an upward pointing thumb on green background, or any other graphical symbol with a generally accepted positive connotation. In yet another case, (a) had the user input the title of a movie for which none of the internet information resources 210 and 212 from the list of internet information resources 202 provided any information relevant to any of the criteria of the list of criteria 204 or (b) had all of the internet information resources from the list of internet information resources been unreachable by means of one of smartphone's 100 communication devices 188, then a clearly discernible graphical indicator indicating that no decision support information for the movie "The Girl with the Dragon Tattoo" could be obtained. In the selected embodiment, the graphical user interface provided on display 102 provides means so that the user can conveniently initiate inputting another movie as described above without requiring editing, restating or otherwise modifying the user's acceptance profile 200.

Figure 3:
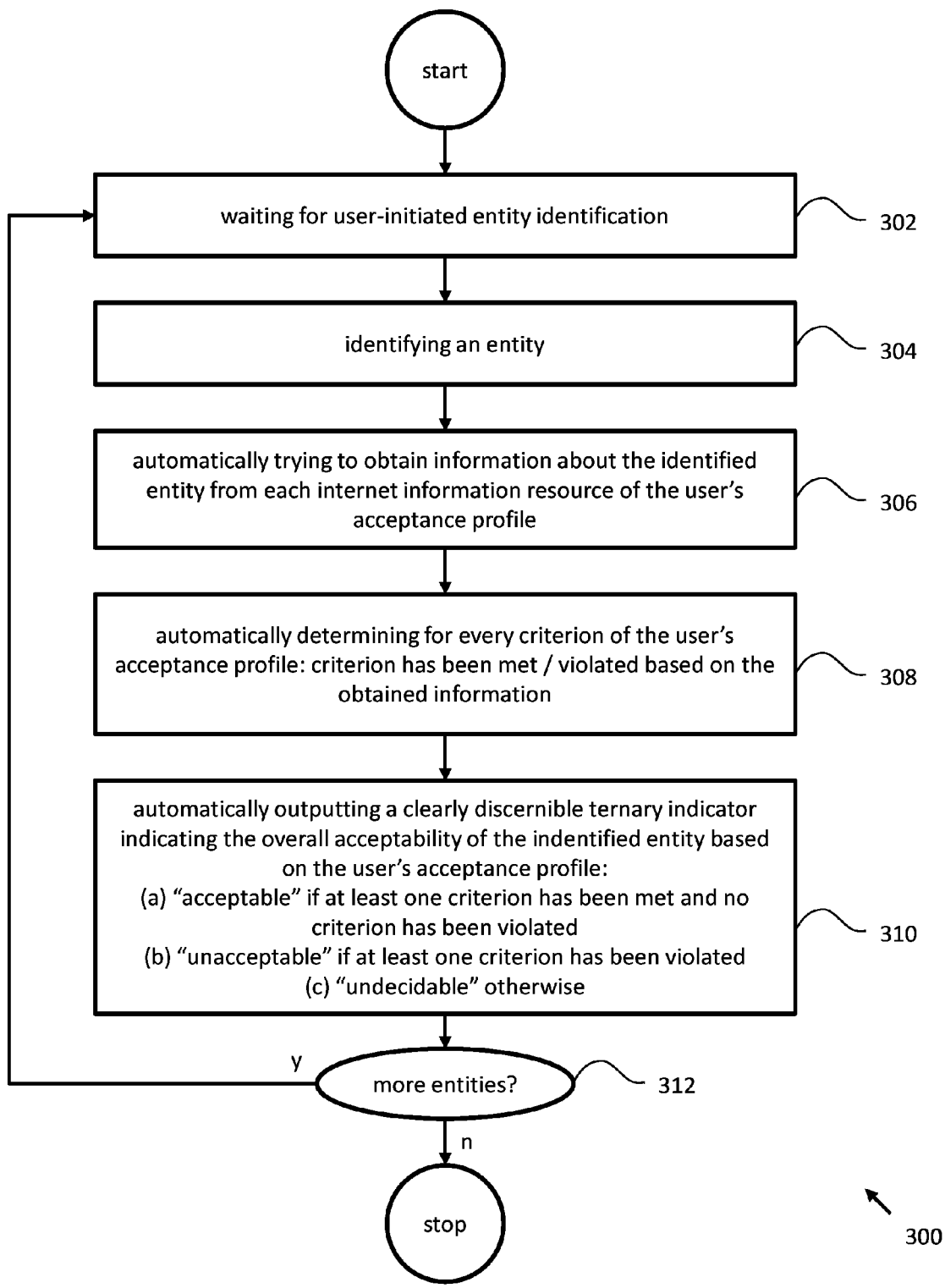
FIG. 3 shows a flowchart illustrating a particular process for obtaining decision support about a particular entity identified in accordance with an embodiment of the invention.

FIG. 3 shows a flowchart 300 illustrating a particular process 300 for obtaining decision support information for an entity in accordance with an embodiment of the invention. Accordingly, at 302, user input for identifying an entity to obtain decision support information about is waited for. In the example of FIG. 2, the expected input identifies a movie. Next, at 304, user input identifying an entity is received and subsequently, at 306, it is automatically tried to obtain information about the identified entity from each internet information resource in the list of internet information resources from the user's acceptance profile. At 308, it is automatically determined for each criterion from the list of criteria from the user's acceptance profile whether that criterion has been met or violated. Next, at 310, based on the outcome of the determination made at 308, a clearly discernible indicator is automatically output. If at least one criterion has been determined to have been met in 308 and no criterion has been determined to have been violated in 308, an indicator indicating "acceptable" is output. If at least one criterion has been determined to have been violated in 308, an indicator indicating "unacceptable" is output. If neither the conditions for outputting an indicator indicating "acceptable" nor the conditions for outputting the indicator for "unacceptable" have been met in 308, an indicator indicating "undecidable" is output. At 312, a determination is made whether or not the user wants to obtain decision support information for additional entities. If so, step 302 is invoked, otherwise, process 300 terminates.

Figure 4A:
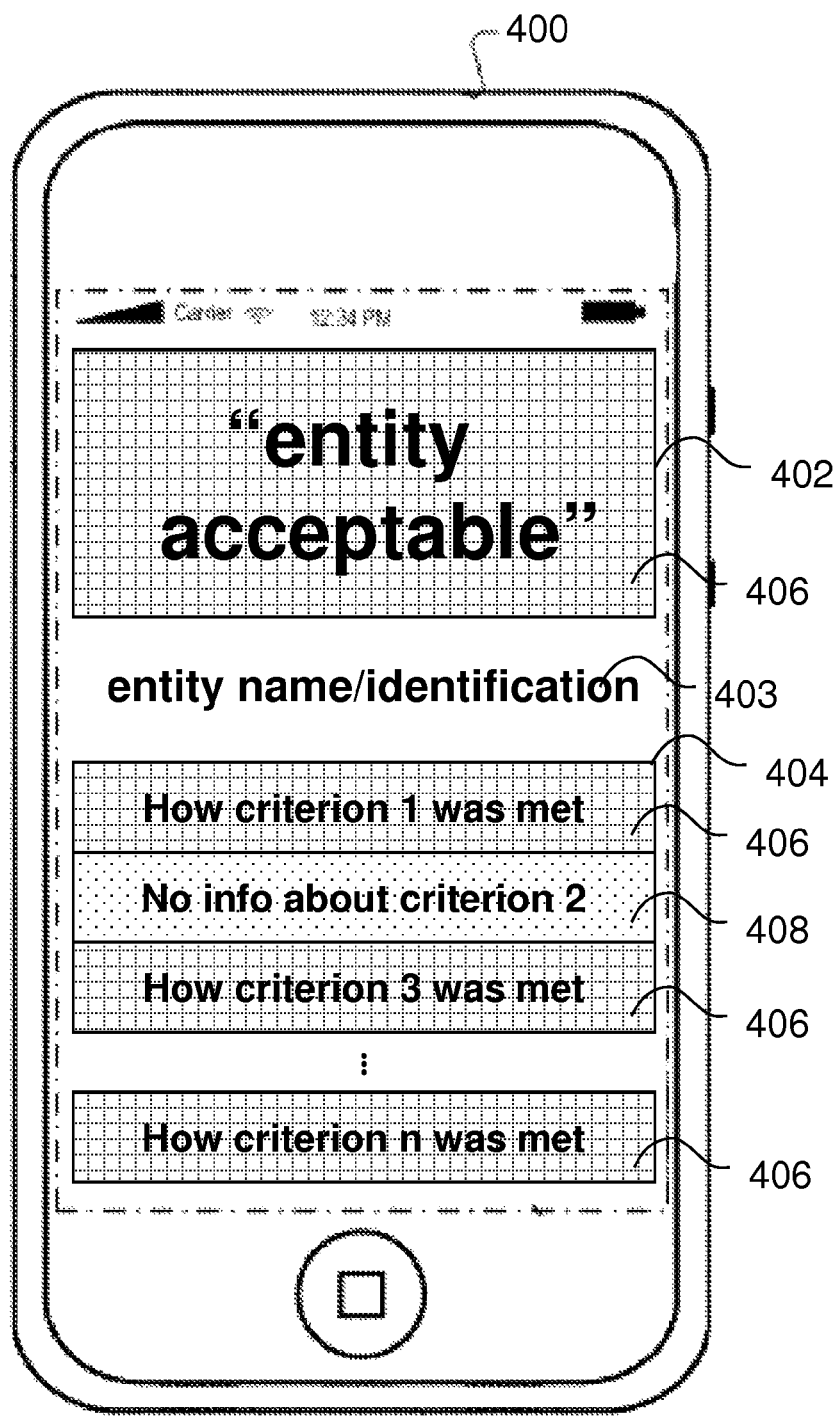
FIGS. 4A-4C depict various exemplary user interfaces consistent with outputting decision support indicators in accordance with an embodiment of the invention.
Figure 4B:
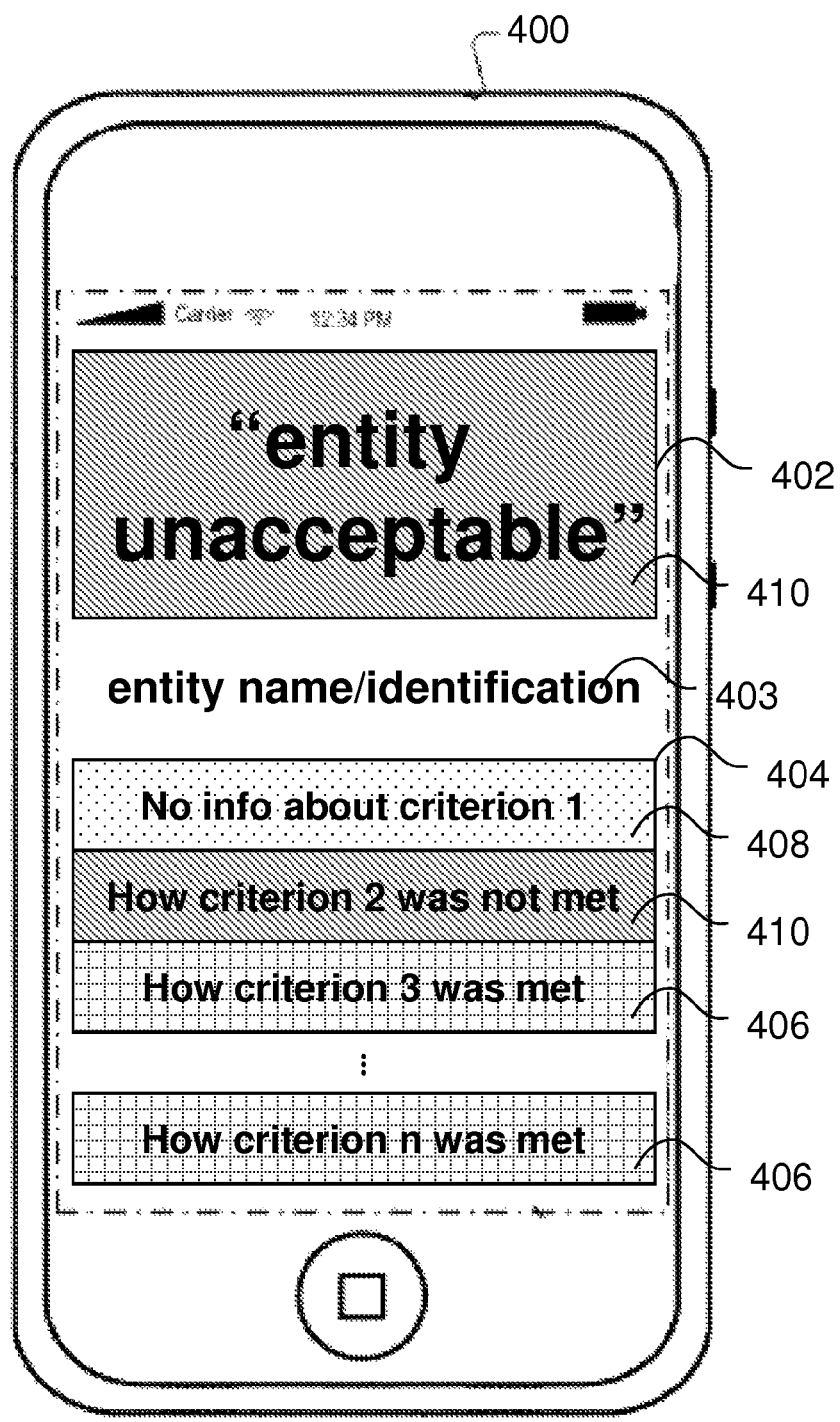
Figure 4C:
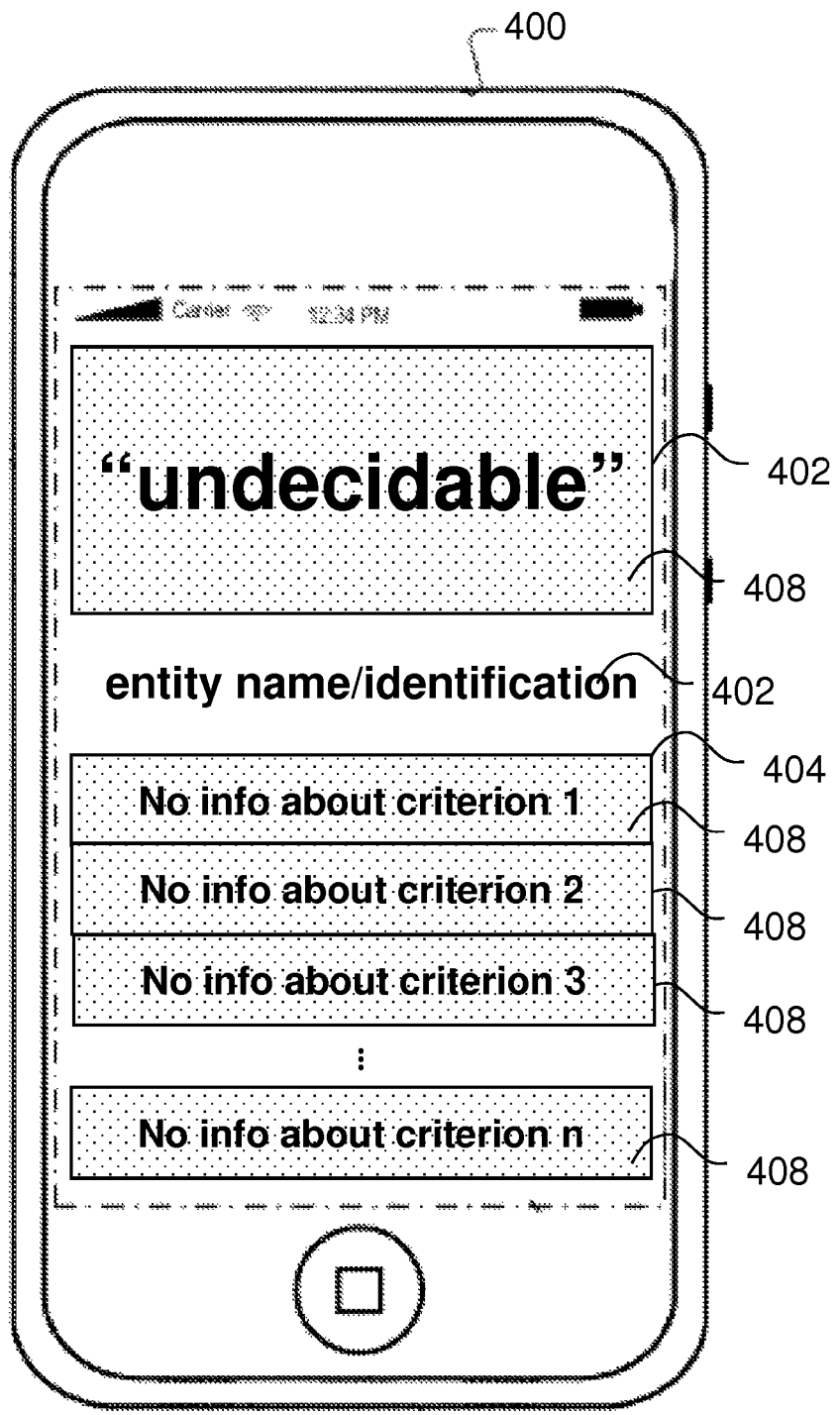

FIGS. 4A-4C illustrate various exemplary decision support information displays consistent with an embodiment of the invention. It is well to note that each of the interfaces described are incorporated into a representative smartphone 100 having a display 102. It should also be noted, that each of the various user interfaces illustrated in FIGS. 4A-4C corresponds to a particular outcome of steps 304, 306, and 308 of process 300. Accordingly, FIG. 4A shows a particular implementation of the decision support interface displayed on smartphone 400 in a case where the specified entity has been determined to be acceptable in accordance with the user's acceptance profile. In some embodiments, the outcome "acceptable" is displayed in a clearly discernible way by means of graphical indicator 402 having a positive connotation as described above. In some implementations, this graphical positive connotation pertains to or is complemented by setting certain display properties 406—including but not limited to a color, texture, etc.—with a positive connotation. In those embodiments displaying a list 404 of how individual criteria of the list of criteria from the user's acceptance profile have been met, those display properties indicating (a) a criterion that has been met (406), (b) a criterion that has been violated (408—see FIG. 4B), or (c) a criterion whose status could not be determined during steps 304, 306, or 308 (410). Entries of list 404 show display properties which correspond to the equivalent overall decision support information for the identified entity, namely (a) "acceptable" (406), (b) "unacceptable" (408), or (c) "undecidable" (410). FIG. 4B shows a particular implementation of the decision support interface displayed on smartphone 400 in a case where the specified entity has been determined to be unacceptable in accordance with the user's acceptance profile. In some embodiments, the outcome "unacceptable" is displayed in a clearly discernible way by means of graphical indicator 402 having a negative connotation as described above. Finally, FIG. 4C shows a particular implementation of the decision support interface displayed on smartphone 400 in a case where no decision support information about the specified entity could be determined in accordance with the user's acceptance profile. It should be noted that in particular implementations of the decision support display shown in FIGS. 4A-4C, some kind of entity identification 403 is displayed to remind the user which entity the decision support information pertains to. It should further be noted with regard to FIGS. 4A-4C that the outcome "acceptable", "unacceptable" and "undecidable" is in compliance with the conditions specified in step 308 of process 300.

OTHER EMBODIMENTS

While this invention has so far been described in terms of a selected embodiment, there are alterations, permutations, and equivalents that fall within the scope of this invention. It should also be noted that there are many alternative ways of implementing both the process and apparatus of the present invention. It is therefore intended that the invention be interpreted as including all such alterations, permutations, and equivalents as fall within the true spirit and scope of the present invention.

For example, in some other embodiments incorporated into a representative smartphone 100, entity identification information can be obtained using any other suitable input mode of smartphone 100, including but not limited to camera 180 (using barcode recognition algorithms for entities with barcodes, or optical character recognition algorithms for entities with text labels, or image recognition algorithms similar to that employed by Google Goggles™ (trademark of Google, Inc. of Mountain View)), or microphone 162 (using voice recognition software). In some other embodiments incorporated into a representative smartphone 100, decision support information can be output using any other output suitable output mode of smartphone 100 that permits clearly discernible ternary "acceptable"/"unacceptable"/"undecidable" output, including, but not limited to speaker 160 and headphones connected to audio jack 166 (playback of audio signals, or prerecorded texts, or synthesized texts), alternate visual output using display 102 (texts, graphics, animations, etc.), or the vibrator (not shown—vibration patterns).

In general, plural instances may be provided for components, operations, or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s). Irrespective of the hardware a particular embodiment is incorporated in, either one or both of steps 306 and 308 of process 300 can be executed outside the portable computing device this invention pertains to. In some of those embodiments, either of both steps 306 and 308 of process 300 can be executed on remote servers. In yet some other embodiments, either of both steps 306 and 308 of process 300 can be executed on computing devices reachable by means of the computing device's data communications interface, including but not limited to smartphones whose characteristics are in accordance with smartphone 100. In some particular embodiments, the invention is incorporated into a portable computing device using near field communication receptors to input entity identities. In some embodiments, augmented reality algorithms are employed to display decision support information by overlaying identified entities with clearly discernible graphical indicators indicating either one of "acceptable", "unacceptable", or "undecidable".

What is claimed is:

1. A method of obtaining ternary "acceptable", "unacceptable", or "undecidable" entity-related decision support information with a portable computing device by way of matching the results of internet data retrieval against user-supplied, persistent preferences, said portable computing device having at least one kind of input, at least one kind of output, and a data communication interface, and the user-supplied, persistent preferences taking the form of an acceptance profile having a list of internet information resources to examine, and a list of acceptability criteria pertaining to said resources, said method comprising:
    waiting for user-initiated entity identification,
    receiving at least one user input via said input device identifying an entity,
    automatically trying to obtain information about said identified entity from each internet information resource of said user's acceptance profile,
    automatically determining for every criterion of said user's acceptance profile whether said criterion has been met or violated based on said obtained information,
    automatically outputting a clearly discernible ternary indicator indicating the overall acceptability of said indentified identified entity based on said user's acceptance profile,
        outputting an indicator indicating "acceptable" if at least one criterion has been met and no criterion has been violated, or
        outputting an indicator indicating "unacceptable" if at least one criterion has been violated, or
        outputting an indicator indicating "undecidable" otherwise.

2. The method of claim 1, wherein said input device comprises a textual input device.

3. The method of claim 1, wherein said input device comprises a haptic input device and said haptic input device is used to provide said user-initiated entity identification from a list of one or more pre-defined entities.

4. The method of claim 1, wherein said input device comprises an optical input device and said optical input device is used to acquire images to identify said entity using barcode recognition algorithms, optical character recognition algorithms, or image recognition algorithms.

5. The method of claim 1, wherein said input device comprises an acoustic input device and said acoustic input device is used to acquire sounds to identify said entity using voice recognition algorithms.

6. The method of claim 1, wherein said input device comprises a near field communications receptor and said near field communications receptor is used to identify said entity.

7. The method of claim 1, wherein said output device comprises a graphical display.

8. The method of claim 1, wherein said output device comprises an acoustic output device and said acoustic output device is used to output decision support information using audio signals, prerecorded texts, or synthesized texts.

9. The method of claim 1, wherein said output device comprises a vibrational output device and said vibrational output device is used to output vibrational patterns.

10. The method of claim 1, wherein said output device comprises an optical output device and said optical output device is used to display decision support information by overlaying said identified entities with said decision support information employing augmented reality algorithms.

11. The method of claim 1, wherein said user's acceptance profile persistently resides on a computing device outside said portable computing devices.

12. The method of claim 1, wherein said steps of said method pertaining to obtaining information about said identified entity and determining whether for every criterion of said user's acceptance profile whether said criterion has been met or violated based on said obtained information, takes place on a computing device outside said portable computing device.

13. The method of claim 1, wherein said decision support information is complemented by a list having one entry for every criterion of said user's acceptance profile, clearly indicating how each criterion has been met, namely whether it has been met, whether it has been violated, or whether no information could be obtained.

14. A machine for obtaining ternary "acceptable", "unacceptable", or "undecidable" entity-related decision support information on a portable computing device, said machine comprising:
    a memory which is able to store user-supplied, persistent preferences taking the form of an acceptance profile having a list of internet information resources to examine, and a list of acceptability criteria pertaining to said resources,
    one or more input means capable of identifying on or more entities,
    one or more output means capable of outputting a clear discernible ternary indicator indicating the overall acceptability of each said identified entity in the form of an "acceptable" indicator, an "unacceptable" indicator, or an "undecidable" indicator,
    a memory controller which will:
        wait for user-initiated entity identification,
        receive at least one user input via one of said input means identifying an entity,
        automatically try to obtain information about said identified entity from each internet information resource of said user's acceptance profile,
        automatically determine for every criterion of said user's acceptance profile whether the criterion has been met or violated based on said obtained information,
        automatically output a clearly discernible ternary indicator indicating the overall acceptability of said identified entity based on said user's acceptance profile, outputting an indicator indicating "acceptable" if at least one criterion has been met and no criterion has been violated, or outputting an indicator indicating "unacceptable" if at least one criterion has been violated, or outputting an indicator indicating "undecidable" otherwise.

15. The method of claim 14, wherein said input means comprises a textual input device.

16. The method of claim 14, wherein said input means comprises a haptic input device and said haptic input device is used to provide said user-initiated entity identification from a list of one or more pre-defined entities.

17. The method of claim 14, wherein said input means comprises an optical input device and said optical input device is used to acquire images to identify said entity using barcode recognition algorithms, optical character recognition algorithms, or image recognition algorithms.

18. The method of claim 14, wherein said input means comprises an acoustic input device and said acoustic input device is used to acquire sounds to identify said entity using voice recognition algorithms.

19. The method of claim 14, wherein said input means comprises a near field communications receptor and said near field communications receptor is used to identify said entity.

20. The method of claim 14, wherein said output means comprises a graphical display.

21. The method of claim 14, wherein said output means comprises an acoustic output device and said acoustic output device is used to output decision support information using audio signals, prerecorded texts, or synthesized texts.

22. The method of claim 14, wherein said output means comprises a vibrational output device and said vibrational output device is used to output vibrational patterns.

23. The method of claim 14, wherein said output means comprises an optical output device and said optical output device is used to display decision support information by overlaying said identified entities with said decision support information employing augmented reality algorithms.

24. The method of claim 14, wherein said memory controller complements said decision support information by a list having one entry for every criterion of said user's acceptance profile, clearly indicating how each criterion has been met, namely whether it has been met, whether it has been violated, or whether no information could be obtained.

* * * * *

UNITED STATES PATENT AND TRADEMARK OFFICE
CERTIFICATE OF CORRECTION

| | |
|---|---|
| PATENT NO. | : 9,092,052 B2 |
| APPLICATION NO. | : 13/859575 |
| DATED | : July 28, 2015 |
| INVENTOR(S) | : Andreas Kornstädt and Ingo Mertins |

It is certified that error appears in the above-identified patent and that said Letters Patent is hereby corrected as shown below:

In the Claims

Column 9, lines 47 and 48, "indentified" should be deleted.

Signed and Sealed this
Eighth Day of March, 2016

Michelle K. Lee
*Director of the United States Patent and Trademark Office*